(12) United States Patent
Sirivara et al.

(10) Patent No.: US 7,133,881 B2
(45) Date of Patent: Nov. 7, 2006

(54) ENCODING AND TRANSFERRING MEDIA CONTENT ONTO REMOVABLE STORAGE

(75) Inventors: Sudheer Sirivara, Hillsboro, OR (US); Jeffrey S. McVeigh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 10/135,962

(22) Filed: Apr. 29, 2002

(65) Prior Publication Data

US 2003/0204519 A1   Oct. 30, 2003

(51) Int. Cl.
*G06F 17/30* (2006.01)
(52) U.S. Cl. .................... 707/104.1; 707/101
(58) Field of Classification Search .................... 707/1, 707/101, 102, 104.1, 9, 10–2; 386/85; 360/64; 369/47.28, 30.17, 30; 375/240; 382/232, 382/239, 236, 238; 341/50; 709/246, 213.229; 710/104, 302; 712/13; 714/7, 13
See application file for complete search history.

(56) References Cited

U.S. PATENT DOCUMENTS

| | | | |
|---|---|---|---|
| 5,493,456 A * | 2/1996 | Augenbraun et al. ......... 360/64 |
| 5,506,872 A * | 4/1996 | Mohler ....................... 375/240 |
| 5,563,961 A * | 10/1996 | Rynderman et al. ........ 382/239 |
| 5,612,788 A * | 3/1997 | Stone ........................... 386/85 |
| 6,055,274 A | 4/2000 | McVeigh ................ 375/240.16 |
| 6,175,654 B1 | 1/2001 | McVeigh ..................... 382/236 |
| 6,320,825 B1 * | 11/2001 | Bruekers et al. ......... 369/30.17 |
| 6,351,567 B1 | 2/2002 | McVeigh et al. ............ 382/238 |
| 6,407,680 B1 | 6/2002 | Lai et al. ....................... 341/50 |
| 6,408,029 B1 | 6/2002 | McVeigh et al. ....... 375/240.13 |
| 6,421,733 B1 | 7/2002 | Tso et al. .................... 709/246 |
| 6,606,287 B1 * | 8/2003 | Korfin et al. ............. 369/47.28 |
| 6,731,808 B1 * | 5/2004 | Van Der Vleuten et al. ..... 382/232 |
| 6,757,687 B1 * | 6/2004 | Davidson et al. ............ 707/101 |
| 6,859,609 B1 * | 2/2005 | Watkins ........................ 386/46 |

* cited by examiner

*Primary Examiner*—Apu Mofiz
*Assistant Examiner*—Yicun Wu
(74) *Attorney, Agent, or Firm*—Blakely, Sokoloff, Taylor & Zafman LLP (57) ABSTRACT

A media content is encoded at multiple bit rates to form a multi-bit-rate encoded media content, wherein the media content contains at least one segment. The multi-bit-rate encoded media content is stored to a first data storage device. An amount of disk space available on a second data storage device is determined and an encoding bit rate is selected for at least one segment that is to be transferred to a second data storage device. The encoded bit rate is based on the amount of storage space available on the second storage device. A quality can be chosen for transcoding an encoded media content to form a transcoded media content, wherein the quality is based on the at least one segment to transfer and the amount of storage space available on the second data storage space.

31 Claims, 5 Drawing Sheets

ENCODING AND TRANSFERRING MEDIA CONTENT ONTO REMOVABLE STORAGE

BACKGROUND OF THE INVENTION

1. Field of Invention

This invention relates generally to multimedia content, and more specifically to multi-bit-rate encoding and transcoding the multimedia content for removable storage devices.

2. Art Background

Portable audio and video players can receive digital media content from a variety of sources. Typically, media content is transferred to the portable device as a download from the Internet or a transfer from a host computer such as a laptop or desktop computer. These portable audio and video players have limited or fixed storage capacity on which the digital media content is stored. The characteristics of the digital media content such as the audio dynamic range, frequency bandwidth, and playtime determine a minimum storage requirement per media item. A media item indicates some quantity of the media and can be a song or an album for example. Similarly, an image quality and a playtime of a video segment will determine a corresponding file size for the video segment.

A raw media stream containing audio and video is formatted for a high quality user experience with devices capable of presenting the high quality user experience to the user. Examples of such devices are wide screen or high definition television, high resolution computer monitors, and compact disk players feeding surround sound audio systems with high dynamic range, wide frequency spectrum audio signals. Media content structured to provide the high quality user experience on the most visually detailed and acoustically sensitive environments places a large demand on the limited storage available on the portable devices such as portable audio and video players. These portable devices typically have removable storage. A non-exclusive list of removable storage includes compact flash cards™, smart media cards™, and micro disk drives.

The portable video player, by its very nature, has a viewing screen that is much smaller than the screen used on a full size television that the media content was originally produced for. Thus, an acceptable user viewing experience on a portable video player can be achieved with a media content encoded at a much lower bit rate than would be required on the full size video viewing devices described above. In like manner, it is often the case that portable audio players are operated in noisy environments that prevent the user from enjoying the full quality of the recorded music because of environmental conditions that present a noise floor that is not present in an optimum listening environment.

Multi-bit-rate encoding has been used to vary the data transfer rate of media content during transfer of the media content over the Internet. Adaptive Streaming Format (AFS™) from Microsoft Corporation and SureStream™ from RealNetworks provide bit-rate scalability ranging from 20 kilobits/sec (Kbps) to over 1 megabit/sec (Mbs) to accommodate the different data transfer rates of the communication links that make up the Internet. MPEG standards can be used to perform encoding at various bit rates as well.

However, the current delivery of media content to portable devices does not include an effective consideration of the parameters of the portable device such as storage size and viewing/listening limitations. The current media transfer schemes to a portable device typically encodes content at the lowest bitrate to accommodate more content or at the highest quality to render the best experience. The user experience is not optimized based on the storage space available and the rendering capabilities of the device.

BRIEF DESCRIPTION OF THE DRAWINGS

The present invention is illustrated by way of example and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of ordinary skill in the art to practice the invention. The following detailed description is, therefore, not to be taken in a limiting sense, and the scope of the invention is defined only by the appended claims.

A system for tailoring media content for a removable and/or portable storage device is disclosed. In various embodiments, the system uses multi-bit-rate encoding and/or transcoding to allow the user to obtain the best possible quality of the media content on a fixed amount of storage space. The user can then selectively degrade the quality of the media content if more content is transferred to the storage device or improve the quality of the content if less content is to be transferred to the storage device.

Figure 1A:
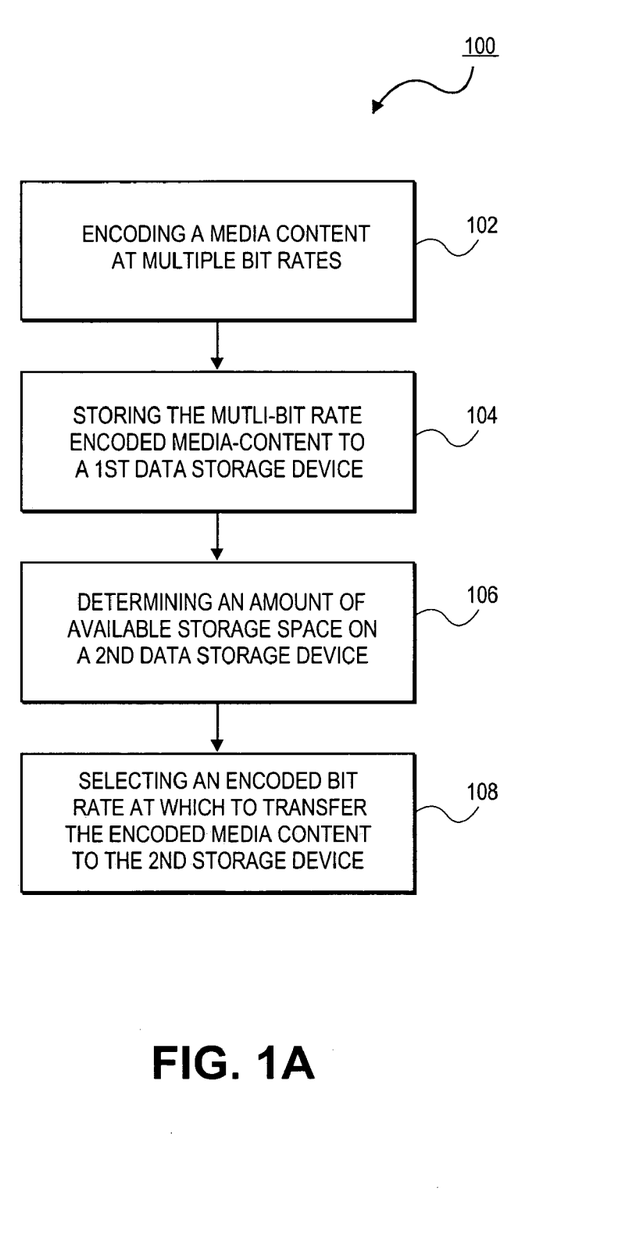
FIG. 1A illustrates a method for multi-bit-rate encoding targeted to a portable device's storage area.

FIG. 1A illustrates a method 100 for multi-bit-rate encoding targeted to a portable device's storage area. With reference to FIG. 1A, a media content is encoded at multiple bit rates 102 and stored on a $1^{st}$ storage device 104 having a sufficient storage capacity, such as a local hard disk drive, an optical disk drive or a remote storage device accessed over the Internet. A user selects media content to transfer to a $2^{nd}$ storage device. This second storage device is removable and/or portable and is the portable audio or video player's storage device. An amount of free space is estimated on the $2^{nd}$ storage device at 106. The combination of the media content selected by the user, the free space available on the $2^{nd}$ storage device, and a requested quality by the user will determine a bit rate for the media content at 108. Quality is used herein to refer to the bit rate of the encoded media content. For example, a higher quality corresponds with a higher number of bits/sec during media play. A lower quality corresponds to a smaller number of bits per/second during media play. A media segment lasts for a fixed amount of time, therefore the quality and the playtime for a given segment will combine to specify a fixed amount of storage required to store the given segment at a given quality.

The media content will then be transferred to the $2^{nd}$ storage device if there is enough free space available on the second storage device. If the user has selected an incompatible amount of media content and associated quality then the method will prompt the user with the option of either reducing the amount of media content selected or reducing the quality of the media content selected. In one or more embodiments of the invention, the $2^{nd}$ storage device of FIG. 1A can correspond with the removable (and/or portable) storage device 160 of FIG. 1B.

Figure 1B:
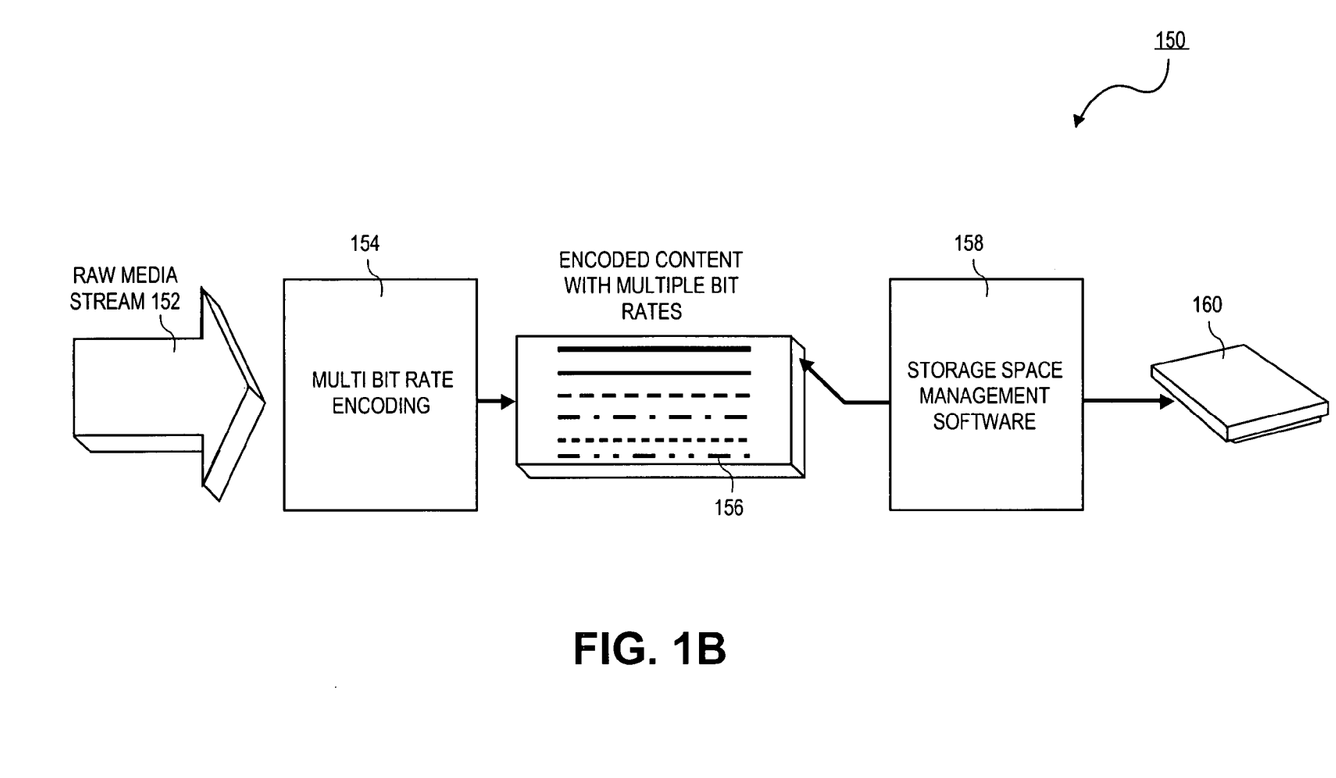
FIG. 1B shows a system level block diagram for multi-bit-rate encoding targeted for a removable storage device.

FIG. 1B shows a system level block diagram for multi-bit-rate encoding targeted for a removable and/or portable storage device. With reference to FIG. 1B, a raw media stream is indicated at 152. Multi-bit-rate encoding is performed at block 154 using well known encoding techniques. Motion Picture Experts Group (MPEG) standard 1, 2, or 4 are examples of encoding standards that can be used to encode the raw media stream 152 as well as to encode the raw media at different bit rates. The different bit rates are stored for future retrieval and transfer to the removable and/or portable storage device.

Some of the functionality provided by storage space management software 158 is to provide the user with feedback on the user's selection of the quality associated with the media content that is selected to be transferred to the removable (and/or portable) storage device and the corresponding determination of the amount of free storage space existing on the removable (and/or portable) storage device 160. The feedback to the user on the amount of free storage space can be done in a flexible manner according to different embodiments of the invention. In one embodiment of the invention, the user can be informed of the amount of storage space available before a selection of media content is made and in another embodiment the user can be informed of the available storage space after the selection is made. In yet another embodiment of the invention, the user can be informed of available storage space both before and after the selection of media content to be transferred to the removable (and/or portable) storage device 160.

The user may make a selection of media content and associated quality thereof; to be transferred to the removable (and/or portable) storage device 160 that exceeds the available storage space on the removable (and/or portable) storage device 160. In this case, the management software can recommend changes to the previous selection of media content and quality or the management software 158 can recommend that the removable (and/or portable) storage device 160 be replaced with another removable (and/or portable) storage device of a given size that will be adequate to receive the user's selection of media content at the corresponding quality desired. Thus, the management software is flexible in design, providing feedback to the user and/or adjusting a user selection such that media content is ultimately transferred to the removable (and/or portable) storage device in a condition suited to provide the user with an optimum viewing and/or listening experience given the constraints of the portable device and its associated removable (and/or portable) storage limitations.

In one embodiment of the invention, management software 158 can receive input from the user via the input/output devices associated with a computer system. A non-exclusive list of such input/output devices is a mouse pointer, a touch screen, and voice command. Management software 158 can notify the user of an incompatible selection of media content and associated encoded bit rates. Based on information so obtained, the user can modify the selection of media content and quality to optimize the media content and quality of the media content transferred to the portable device based on the user's particular preferences.

Various existing removable (and/or portable) storage media can be used for removable storage device 160. A non-exclusive list of such removable (and/or portable) storage devices includes a compact flash card™, a smart media card™, or a micro disk drive. Removable (and/or portable) storage device 160 can be located within a portable audio and/or video player that is capable of wireless communication with the $1^{st}$ data storage device discussed in conjunction with FIG. 10A. Wireless communication links such as Bluetooth can be used to provide transfer of the selected media content between the $1^{st}$ data storage device (FIG. 1A) and the $2^{nd}$ data storage device (FIG. 1A) or the removable (and/or portable) storage device 160 (FIG. 1B).

Figure 2:
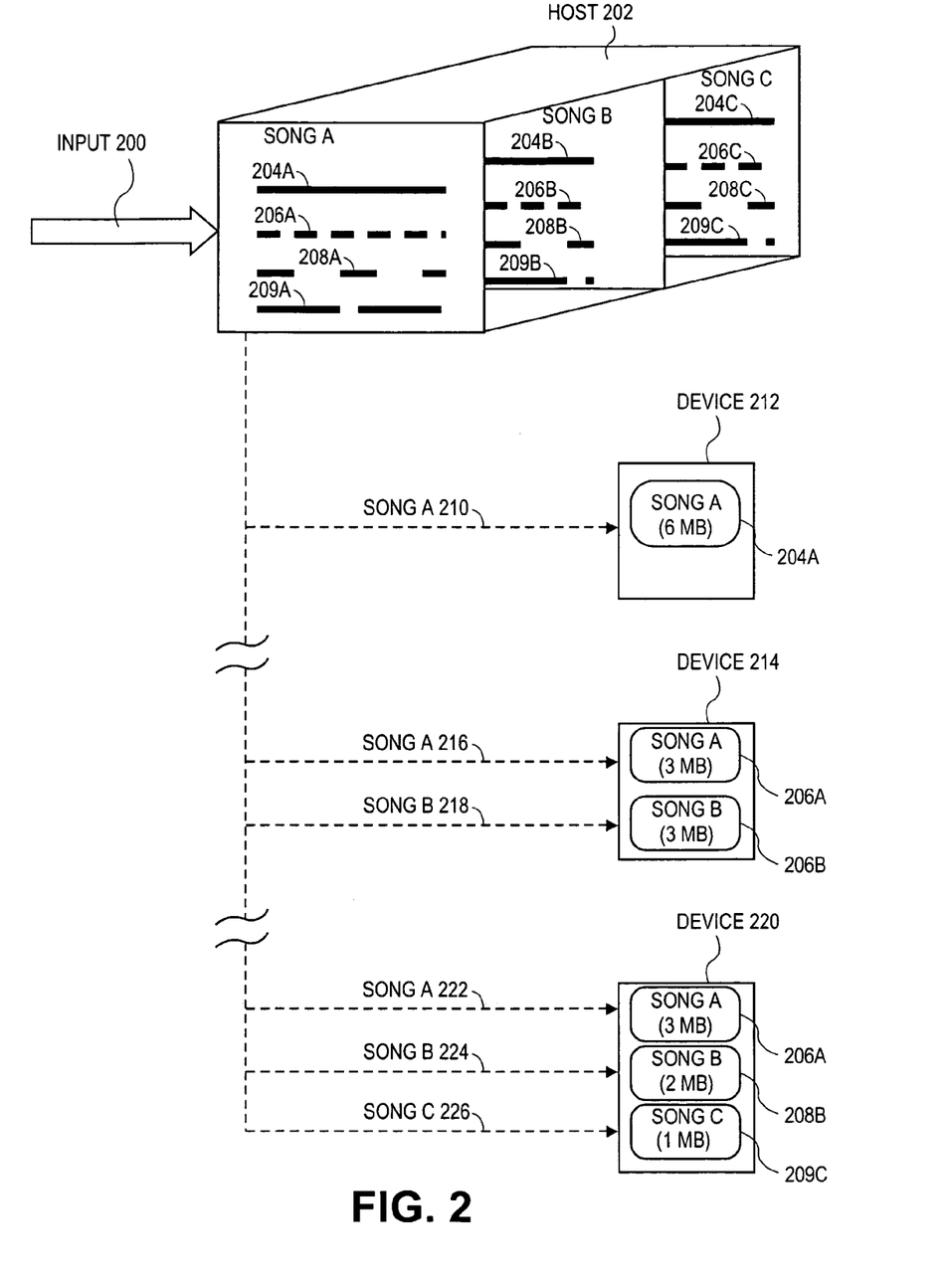
FIG. 2 illustrates transferring several different combinations of media content to a portable storage device.

As previously discussed in conjunction with FIG. 1B, the user can select various combinations of media content and corresponding quality of the media content for transfer to the device 160. FIG. 2 illustrates transferring several different combinations of media content to a portable storage device. In general, the input media content 200 can be any media content that allows for the tradeoff between media content file size and quality (any media content that can be encoded with loss to achieve a particular file size). Such media content includes but is not limited to any single audio or video file, or group thereof as well as images. Images are not limited to digital images from a digital camera but can include the presentation of data in various forms. An example of lossy compression of stock market data could be to restrict a group of data displayed to those companies with a market capitalization under or above a certain value. Another example could be to display a map showing only those rivers in a given geographic area that yield over or under a certain amount of Salmon annually. Instead of a map, the data could be displayed as a list of river names. The use of the term media content is not to be taken in a restrictive sense, but as mentioned above, incorporates any media content that can be encoded with loss to achieve a particular file size. In the case of data as media content, loss can be applied to both the data set of companies or rivers (in the examples above) as well as to the encoding used to change the number of bits in the image displayed for viewing.

Three different selections of audio media content, are illustrated in FIG. 2. These three different selections of audio media content are stored on device 212, device 214, and device 220 respectively. With respect to FIG. 2, a host 202 receives an input stream 200 of media content. In this example, the input media stream 200 is made up of three segments of audio indicated by song A, song B, and song C. In another example, a segment can refer to a single image of media content that may represent data (as discussed above). The host 202 can be a host computer system capable of performing multi-bit-rate encoding, as described previously. The three segments are encoded at multiple bit rates, as indicated by 204a, 206a, 208a, and 209a for song A. These four bit rates create file sizes of 6MB, 3MB, 2MB, and 1MB respectively for this non-limiting example. The same multiple bit rat resulting in 204b (6MB), 206b (3MB), 208b (2MB), and 209b (1MB). Similarly, the same multiple bit rate encodings applied to song C result in 204c (6MB), 206c (3MB), 208c (2MB), and 209c (1MB). These multi-bit-rate encodings of the three segments are stored on the first storage device that resides in the host 202. The $1^{st}$ storage device (not shown) corresponds to the $1^{st}$ storage device described in conjunction with FIG. 1A. The devices 212, 214, and 216 correspond to the $2^{nd}$ storage device of FIG. 1A and/or the removable (and/or portable) storage device 160 of FIG. 1B.

The size of the removable and/or portable storage device is limited as was previously described. For the example presented in FIG. 2, the size of the storage device will be arbitrarily set to 6 megabytes (MB). The present invention is not limited by the size of the storage device associated with the portable audio and/or video player. With respect to FIG. 2, a first selection 210 initiates the transfer of song A to device 212 at a maximum quality indicated by 204a, which results in the entire 6MB of available storage space on device 212 being occupied by song A. In the alternative or subsequent to the first selection, the user can make a second selection.

The second selection initiates the transfer of song A and song B as indicated by 216 and 218. In this second selection a lower quality is selected for both songs, resulting in a file size of 3MB. As before, with the first selection and device 212, the entire available storage space on device 214 is occupied by the media content of the second selection. If the second selection was made subsequent to the first selection, the storage space management software 158 (FIG. 1B) would overwrite the first selection in order to perform the transfer required by the second selection.

In the alternative, or subsequent to the second or first selection, the user can perform a third selection. In this example, the third selection includes transferring songs A, B, and C, indicated by 222, 224 and 226. In this third selection, chosen for illustrative purposes, song A is selected for transfer at a quality of 3MB, song B is selected for transfer at a quality of 2MB, and song C is selected for transfer at a quality of 1MB. Three songs are transferred to the device 220 at differing quality as selected by the user. The third selection could have been performed in alternative ways. For example, all three songs could have been selected at qualities that create file sizes of either 2MB or 1MB consistent with the available storage of 6MB on the portable device 220. The only constraint on the selection of songs to be transferred to the portable device 220 is the size of the available storage area on the portable device. Thus, any combination of songs A, B, and C may be transferred to the portable device consistent with the requirement that the combined size of the songs, as determined by the bit rates of the encoding selected (qualities), fits within the available storage space on the portable device.

Figure 3A:
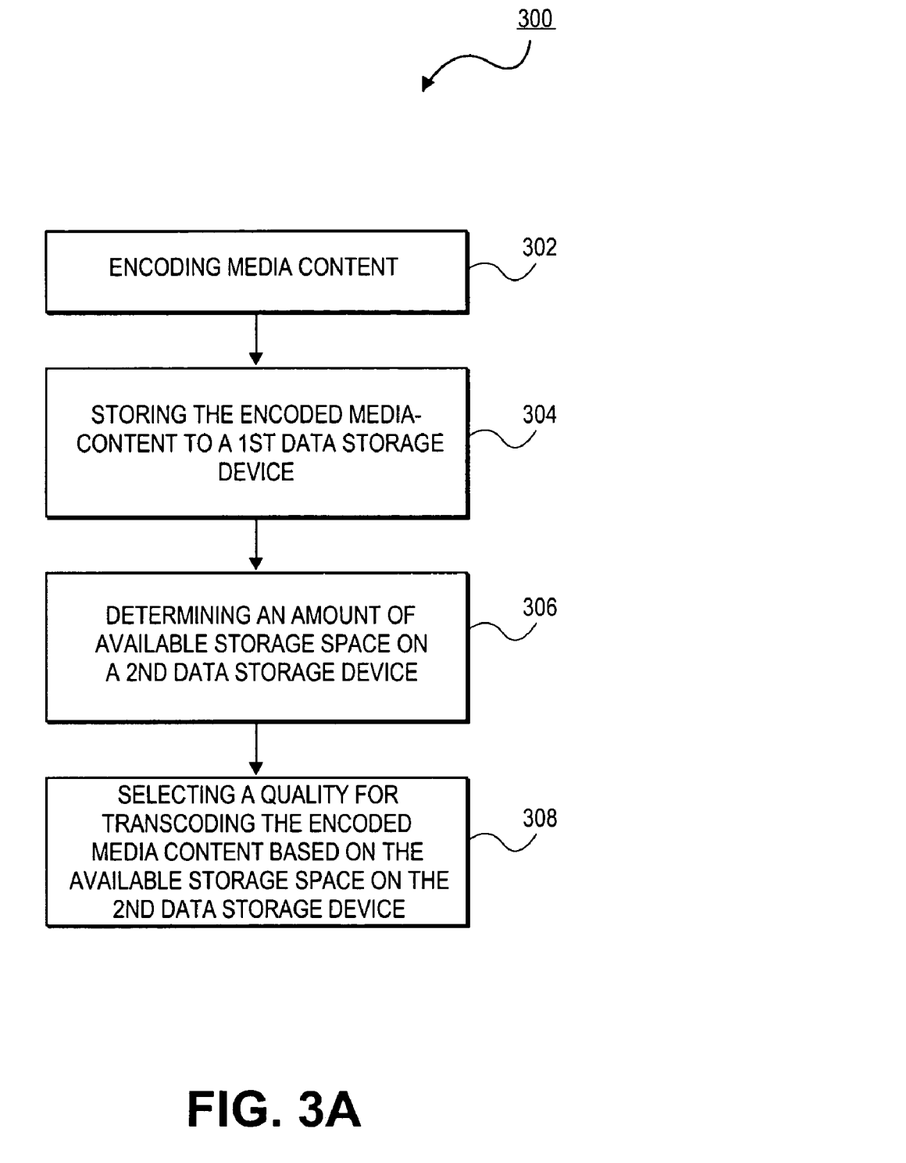
FIG. 3A illustrates a method for transcoding media content for a portable storage device.

In another embodiment of the invention, transcoding can be employed to provide transfer of media content, encoded at bit rates that optimize the user's listening and/or viewing experience with the removable (and/or portable) storage device 160. FIG. 3A illustrates a method for transcoding media content for the removable (and/or portable) storage device 160. With reference to FIG. 3A, media content is encoded at block 302 in high quality. The high quality encoding that is performed in block 302 is equivalent to the highest quality encoding performed in the multi-bit-rate encoding example of FIG. 2 (204a, 204b, and 204c). With reference back to FIG. 3A, the high quality encoding is stored to a $1^{st}$ data storage device during a process represented by a block 304. The user selects one or more media content items for transfer to the $2^{nd}$ storage device and the amount of space available on the $2^{nd}$ storage device is determined in a block 306. A quality for transcoding the media content previously selected for transfer to the $2^{nd}$ storage device is determined from either the user or automatically using predefined algorithms.

Transcoding, as is well known in the art, includes the process of decoding the originally stored encoding and then re-encoding, typically at a different bit rate (quality) than the original encoding. The re-encoding is usually performed at a lower bit rate than the original encoding. The lower bit rate encodings require less storage space and are suited for transfer to the $2^{nd}$ storage device, which is a smaller storage volume than the $1^{st}$ storage device that contains the original high quality encoded media content. Transcoding of the media content can be performed using methods that are well known in the art, the invention is not limited by the methods used for transcoding the media content.

Figure 3B:
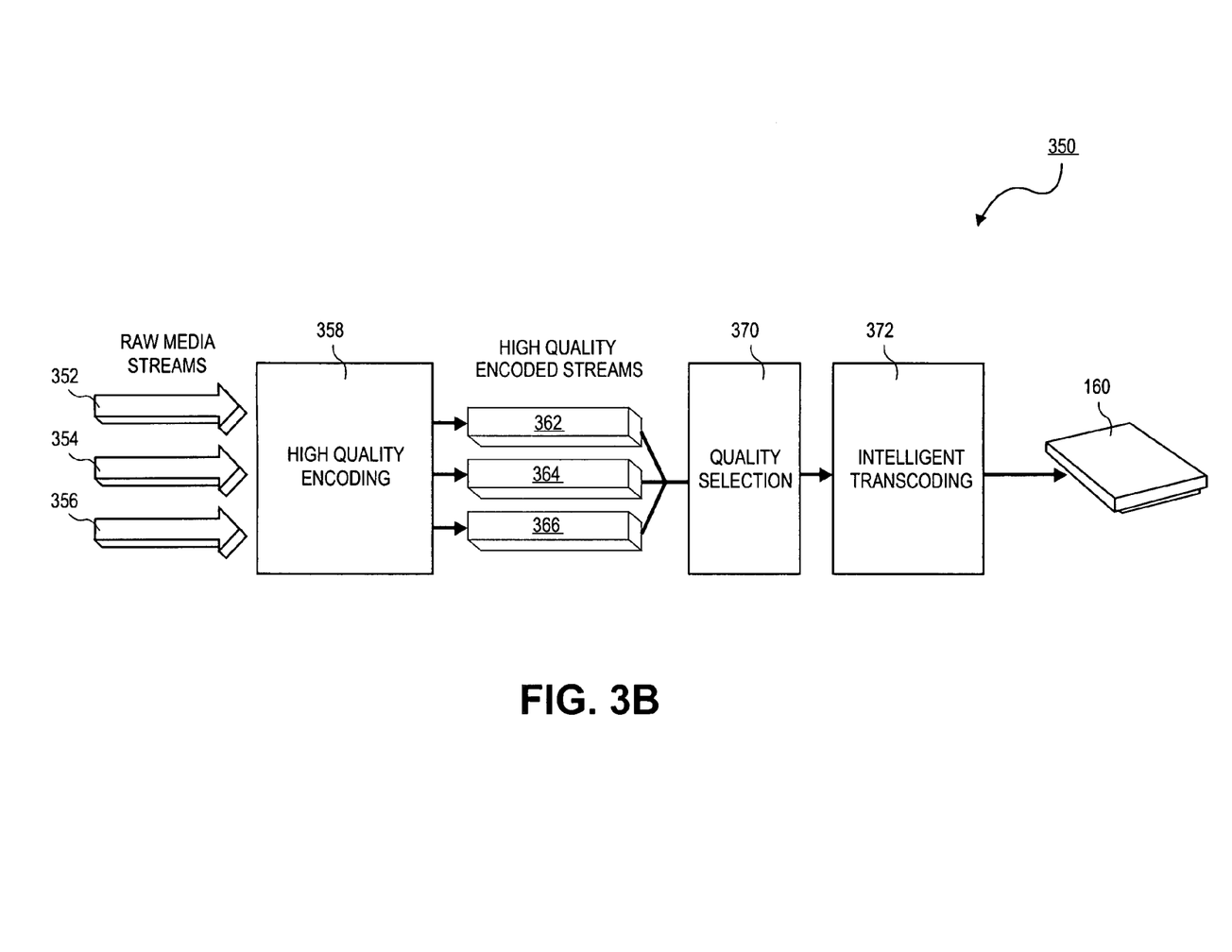
FIG. 3B shows a system level block diagram for transcoding media content targeted for a removable storage device.

In one embodiment of the invention, the user would select the desired quality to be used for the transcoding process. Selecting the desired quality can be done similarly to the way multi-bit-rate encoding was described in the previous sections in conjunction with FIG. 1A, FIG. 1B, and FIG. 2, the constraint being that the output of the transcoding process must fit on the available storage space that exists on the $2^{nd}$ storage device. The $2^{nd}$ storage device is similar to the removable (and/or portable) storage device 160 (FIG. 1B and FIG. 3B). In another embodiment of the invention, the quality to be used for the transcoding process can be selected automatically by an algorithm that is biased to using the highest quality possible within the constraint of the size of the storage space available on the $2^{nd}$ storage device. The algorithm can be biased in many different ways and can be preprogrammed by the user to implement the preferences of the particular user. For example, the user may wish to transcode media content items of a particular "type" at the highest quality while media content items of another "type" would be transcoded at lower quality. In one non-limiting example, if "type" distinguishes music media and video media the user may wish to transcode music at a higher quality and video at a lower quality. Another user may choose the reverse situation choosing to encode music at low quality and video at high quality. Another variation can be to make the quality vary inversely proportional to the number of media items chosen for transfer. In this example, when the number of items chosen for transfer is the high, then the quality of each item would be low. When the number of items chosen for transfer is low than the quality would be high.

Alternatively "type" can be used to distinguish media items of a particular genera, for example "rock music" verses "jazz" music. The user may wish to trans-code "jazz" at one quality and "rock music" at another quality. Many different ways of choosing the quality for transcoding are contemplated within the scope of the invention. The invention is not limited by the way in which the quality is chosen or determined for the transcoding of media content items.

FIG. 3B shows a system level block diagram for transcoding media content targeted for a removable storage device. With reference to FIG. 3B, raw media streams 352, 354, and 356 are received and are encoded at high quality in block 358. The high quality encoding will be the highest level encoding available for transfer to the removable (and/or portable) storage device. The high quality encodings are stored on the $1^{st}$ storage device previously described in conjunction with FIG. 3A. Referring back to FIG. 3B, each high quality encoding results in a high quality encode stream. For example, raw media stream 352 results in a high quality encoded stream 362, a raw media stream 354 results in a high quality encoded stream 364, and a raw media stream 356 results in a high quality encoded stream 366. Once one or more media content items are selected for transfer to the portable device, quality selection takes place in block 370. The quality selection taking place in block 370 follows the processes described in conjunction with FIG. 3A. Referring back to FIG. 3B, intelligent transcoding occurs in block 372. The intelligent transcoding is performed consistent with the requirements of the user and the available storage space on the $2^{nd}$ storage device as described in conjunction with FIG. 3A.

The previously described processes of multi-bit-rate encoding and transcoding can be used individually to resize media content files for the smaller storage size of the portable audio and/or video devices. Alternatively, the process of multi-bit-rate encoding and transcoding can be combined together in embodiments of the invention. In one example, multi-bit-rate encoding can be used to produce coarse scaling of the media content file size. Transcoding can be used to create fine scaling within the coarse scaling produced by the multi-bit-rate encoding. File sizes within the range of file sizes created by the multi-bit-rate encoding can be produced by combining transcoding with multi-bit-rate encoding. Many other combinations of multi-bit-rate encoding and transcoding are contemplated within the scope of the invention and the appended claims.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions, which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, novel methods and apparatuses for multi-bit-rate encoding and transcoding of media content for removable (and/or portable) devices are described. Although the invention is described herein with reference to specific preferred embodiments, many modifications therein will readily occur to those of ordinary skill in the art. Accordingly, all such variations and modifications are included within the intended scope of the invention as defined by the following claims.

What is claimed is:

1. A method comprising:
   encoding a media content at multiple bit rates to form a multi-bit-rate encoded media content, wherein the media content contains at least one segment;
   storing the multi-bit-rate encoded media content to a first data storage device in a host;
   determining an amount of disk space available on a second data storage device in a portable device separate from the host, wherein the portable device is a portable audio player and/or a portable video player;
   selecting an encoded bit rate for at least one segment to transfer to the second data storage device based on the amount of storage space available on the second storage device; and
   transferring the at least one segment from the first data storage in the host to the second data storage device in the portable audio player and/or the portable video player, wherein the encoded bit rate is determined by the selecting.

2. The method of claim 1, further comprising:
   selecting at least a second segment to transfer; and
   selecting an encoded bit rate for the at least one segment to transfer and an encoded bit rate for the at least a second segment to transfer.

3. The method of claim 2, further comprising transferring the media content to the second data storage device at the bit rate determined by the selecting.

4. The method of claim 1, wherein the multi-bit-rate encoded media content is included in one file.

5. The method of claim 1, wherein the second storage device is removable.

6. The method of claim 5, wherein the second data storage device is selected from the group consisting of a magnetic disk drive, a random access memory, an erasable optical disk drive, a read/writable compact disk (CD-RW), a compact flash card, and a smart media card.

7. A method comprising:
   encoding a media content wherein the media content contains at least one segment;
   storing the encoded media content to a first data storage device in a host;
   selecting at least one segment to transfer to a second data storage device in a portable device separate from the host, wherein the portable device is a portable audio player and/or a portable video player;
   choosing a quality for transcoding the encoded media content to form a transcoded media content, wherein the quality is based on the at least one segment to transfer and a size of the second data storage space; and
   transcoding the at least one segment to transfer.

8. The method of claim 7, further comprising transferring the transcoded media content to the second data storage device.

9. The method of claim 7, further comprising:
   selecting at least a second segment to transfer; and
   selecting a first quality for the at least one segment to transfer and a second quality for the at least a second segment to transfer, wherein the selecting is based on the segments to transfer and a size of the second data storage space; and
   transcoding the at least one segment to transfer and the at least a second segment to transfer.

10. The method of claim 9, further comprising transferring the transcoded media content to the second data storage device.

11. The method of claim 7, wherein the transcoded media content is included in one file.

12. The method of claim 7, wherein the second storage device is removable.

13. The method of claim 12, wherein the second data storage device is selected from the group consisting of a magnetic disk drive, a random access memory, an erasable optical disk drive, a read/writable compact disk (CD-RW), a compact flash card, and a smart media card.

14. A tangible computer readable medium containing executable computer program instructions, which when executed by a data processing system, cause the data processing system to perform a method comprising:
encoding a media content at multiple bit rates to form a multi-bit-rate encoded media content, wherein the media content contains at least one segment;
storing the multi-bit-rate encoded media content to a first data storage device in a host;
determining an amount of disk space available on a second data storage device in a portable audio player and/or a portable video player separate from the host; and
selecting an encoded bit rate for at least one segment to transfer to a second data storage device based on the amount of storage space available on the second storage device.

15. The tangible computer readable medium as set forth in claim 14, wherein the method further comprises
transferring the at least one segment to the second data storage device, wherein the encoded bit rate is determined by the selecting.

16. The tangible computer readable medium as set forth in claim 14, wherein the method further comprises:
selecting at least a second segment to transfer; and selecting, an encoded bit rate for the at least one segment to transfer and an encoded bit rate for the at least a second segment to transfer.

17. A tangible computer readable medium containing executable computer program instructions, which when executed by a data processing system, cause the data processing system to perform a method comprising:
encoding a media content wherein the media content contains at least one segment;
storing the encoded media content to a first data storage device in a host; selecting at least one segment to transfer to a second data storage device in a portable audio player and/or a portable video player separate from the host; choosing a quality for transcoding the encoded media content to form a transcoded media content, wherein the quality is based on the at least one segment to transfer and a size of the second data storage space; and transcoding the at least one segment to transfer.

18. The tangible computer readable medium as set forth in claim 17, wherein the method further comprises transferring the transcoded media content to the second data storage device.

19. The tangible computer readable medium as set forth in claim 17, wherein the method further comprises:
selecting at least a second segment to transfer; and
selecting a first quality for the at least one segment to transfer and a second quality for the at least a second segment to transfer, wherein the selecting is based on the segments to transfer and a size of the second data storage space; and
transcoding the at least one segment to transfer and the at least a second segment to transfer.

20. An apparatus comprising: an encoder to encode a media content at multiple bit rates, wherein the media content contains at least one segment; a first data storage device in a host, the first data storage device coupled with the encoder to store the encoded media content; and a tangible computer readable medium containing executable computer program instructions, which when executed by the apparatus, cause the apparatus to perform a method comprising:
encoding a media content at multiple bit rates to form a multi-bit-rate encoded media content, wherein the media content contains at least one segment; storing the multi-bit-rate encoded media content to the first data storage device; determining an amount of disk space available on a second data storage device in a portable audio player and/or a portable video player separate from the host; and selecting an encoded bit rate for at least one segment to transfer to the second data storage device based on the amount of storage space available on the second storage device.

21. The apparatus of claim 20, wherein the second data storage device is removable.

22. The apparatus of claim 21, wherein the second data storage device is elected from the group consisting of a magnetic disk drive, a random access memory, an erasable optical disk drive, a read/writable compact disk (CD-RW), a compact flash card, and a smart media card.

23. An apparatus comprising:
an encoder to encode a media content, wherein the media content contains at least one segment; a first data storage in a host, the first data storage device coupled with the encoder to store the encoded media content; and
a tangible computer readable medium containing executable computer program instructions, which when executed by the apparatus, cause the apparatus to perform a method:
encoding the media content wherein the media content contains at least one segment;
storing the encoded media content to the first data storage device;
selecting at least one segment to transfer to a second data storage device in a portable audio player and/or a portable video player separate from the host;
choosing a quality for transcoding the encoded media content to form a transcoded media content, wherein the quality is based on the at least one segment to transfer and a size of the second data storage space; and
transcoding the at least one segment to transfer.

24. The apparatus of claim 23, wherein the second data storage device is removable.

25. The apparatus of claim 24, wherein the second data storage device is selected from the group consisting of a magnetic disk drive, a random access memory, an erasable optical disk drive, a read/writable compact disk (CD-RW), a compact flash card, and a smart media card.

26. An apparatus comprising:
a host having:
a system bus;
a processor coupled with the system bus;
an encoder coupled with the system bus to encode a media content,
wherein the media content contains at least one segment; a first data storage device coupled with the encoder to store the encoded media content; and
a tangible computer readable medium containing executable computer program instructions, which when executed by the processor, cause the apparatus to perform a method comprising:
encoding the media content wherein the media content contains at least one segment;
storing the encoded media content to the first data storage device;
selecting at least one segment to transfer to a second data storage device in a portable audio player and/or a portable video player separate from the host;
choosing a quality for transcoding the encoded media content to form a transcoded media content, wherein the quality is based on the at least one segment to transfer and a size of the second data storage space; and transcoding the at least one segment to transfer.

27. The apparatus of claim 26, wherein the second data storage device in the portable audio player and/or the portable video player is coupled to the apparatus by a wireless network.

28. The apparatus of claim 26, wherein the second data storage device is removable from the apparatus.

29. An apparatus comprising:
 a host having:
  a system bus;
  a processor coupled with the system bus;
  an encoder coupled with the system bus to encode a media content, wherein the media content contains at least one segment;
  a first data storage device coupled with the encoder to store the encoded media content; and
 a computer readable medium containing executable computer program instructions, which when executed by the processor, cause the apparatus to perform a method comprising:
  encoding the media content wherein the media content contains at least one segment;
  storing the encoded media content to the first data storage device in the host;
  selecting at least one segment to transfer to a second data storage device in a portable audio player and/or a portable video player separate from the host;
  choosing a quality for transcoding the encoded media content to form a transcoded media content, wherein the quality is based on the at least one segment to transfer and a size of the second data storage space; and
  transcoding the at least one segment to transfer.

30. The apparatus of claim 29, wherein the second data storage device in the portable audio player and/or the portable video player is coupled to the apparatus by a wireless network.

31. The apparatus of claim 29, wherein the second data storage device is removable from the apparatus.

* * * * *